S. G. WELCH.
Wheel Cultivator.
No. 41,555.
Patented Feb. 9, 1864.
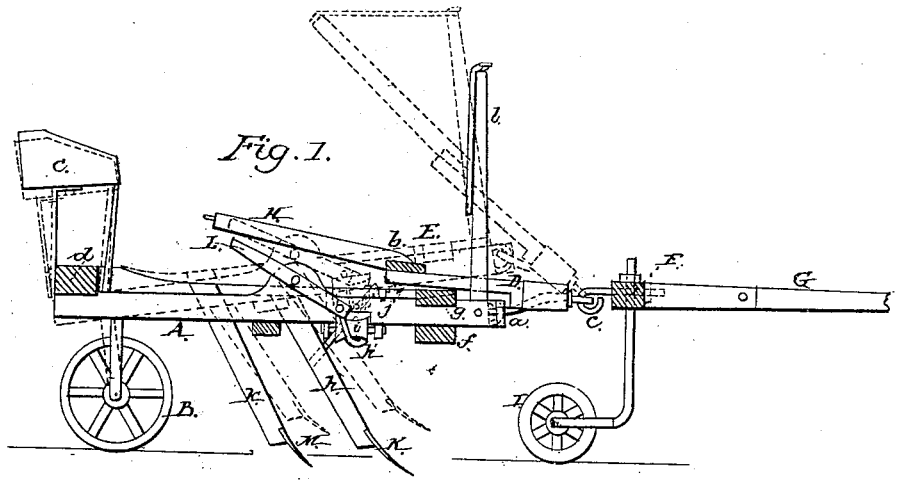
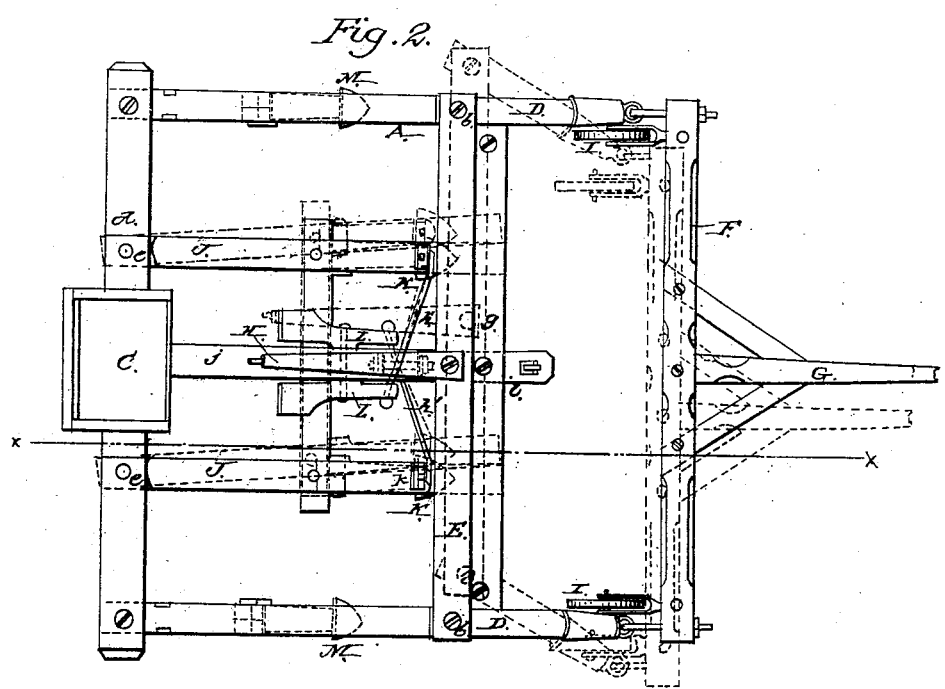

UNITED STATES PATENT OFFICE.

SAMUEL G. WELCH, OF ATHENS, ILLINOIS.

IMPROVEMENT IN CULTIVATORS.

Specification forming part of Letters Patent No. 41,555, dated February 9, 1864.

*To all whom it may concern:*

Be it known that I, SAMUEL G. WELCH, of Athens, in the county of Menard and State of Illinois, have invented a new and Improved Cultivator; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the several figures.

The invention consists in a novel arrangement for raising and lowering the plows and guiding the machine, as hereinafter fully set forth, whereby the driver has full control both over the draft-animals and the machine.

To enable those skilled in the art to fully understand and construct my invention, I will proceed to describe it.

A represents a rectangular frame, the back part of which is supported by two wheels, B B, one at each side. C is the driver's seat, which is placed on the back part of the frame A. The front end of the frame A is connected by hooks or joints $a\ a$ to levers D D, the back ends of which are connected by pivots $b$ to a bar, E, and the front ends connected by hooks or joints $c$ to a bar, F, which has the draft-pole G attached to it.

To the center of the bar E, which connects the back ends of the levers D D, there is attached a lever, H. The bar F is supported by two caster-wheels, I I, one at each end.

To the back cross-bar, $d$, of the frame A there are attached, by pivots $e$, two bars, J J, the front ends of which rest on the front bar, $f$, of the frame A, and are covered by a cap-piece, $g$, which retains them in proper position on bar $f$, but allows them to slide freely on said bar. Each bar J has an inclined standard, $h$, attached to it, and to the lower end of each standard there is secured a plow, K, which may be of the usual shovel form. To each bar J there is also attached a cord or chain, $h'$. These cords or chains pass under a roller, $i$, the bearings of which are at the under side of a longitudinal bar, $j$, at the center of the frame A, the ends of said cords or chains being attached to treadles L L, placed one at each side of the bar $j$ and within convenient reach of the feet of the driver on seat C. By operating the treadles L the bars J may be moved laterally, and consequently the plows K, as shown in red in Fig. 2, and the plows moved or adjusted to conform to the sinuosities of the rows of corn and prevent the plants being plowed out.

The earth in the spaces between the rows of corn is plowed by fixed plows M, attached to standards $k$, secured to the side bars of the frame A, the movable plows K working one at each side of the row. The plows may be raised out of the ground, when desired, by raising the lever H, as shown in red in Fig. 1, and said lever H may be held in an elevated position by a strap or chain attached to an upright, $l$, at the front end of the bar $j$ of the frame A. By moving the lever H laterally the bar F and draft-pole may be adjusted either to the right or left, as shown in red in Fig. 2, thereby changing the draft relatively with the body or main portion of the machine, and expeditiously guiding the machine either to the right or left.

I do not claim broadly the use of laterally-moving or adjustable plows, for they have been previously used; but I do claim as new and desire to secure by Letters Patent—

The bar F, having the draft-pole G attached, supported by the caster-wheels I I, and connected to the frame A by levers D D, the back ends of which are connected to the bar E, having a lever, H, secured to it, and all arranged so as to admit of the raising and lowering of the plows and the lateral adjustment of the draft-pole relatively with the body or main portion of the machine, as set forth.

SAMUEL G. WELCH.

Witnesses:
E. H. WELCH,
A. A. LANE.